Figure 1:
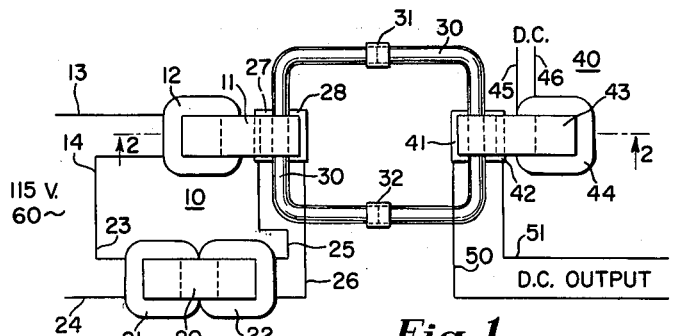

May 8, 1962 W. L. CARLSON, JR 3,034,002
CONDUCTIVE FLUID POWER TRANSFORMER
Filed June 17, 1958

INVENTOR.
WILLIAM L. CARLSON, JR.
BY Joseph E. Ryan
ATTORNEY 3,034,002
CONDUCTIVE FLUID POWER TRANSFORMER
William L. Carlson, Jr., Bloomington, Minn., assignor to Minneapolis-Honeywell Regulator Company, Minneapolis, Minn., a corporation of Delaware
Filed June 17, 1958, Ser. No. 742,558
2 Claims. (Cl. 310—11)

The present invention is directed to a novel type of fluid power transformer capable of converting levels of electrical energy. More specifically, the present novel device utilizes conductive fluid or liquid metal pumps to create a flow of a conductive fluid and the flow is then converted back into electrical energy by means of a conductive fluid or liquid metal current generating device.

The principles involved in the operation of a conductive fluid or liquid metal pump have been known for many years and were originally recognized by Faraday in approximately 1850. Faraday recognized that a conductive fluid could be caused to flow under the mutually perpendicular influence of a current passing through the fluid when acted on by a magnetic field. This principle has been utilized both to create a flow of a fluid as well as to detect the flow of a fluid and in turn supply an electrical signal which would be indicative of the rate of flow. Conductive fluid systems have used conductive fluid flow meters to indicate the rate of flow of fluid. However, the applicant is unaware of the use of this principle as a means of power transformation as opposed to a mere indication that a fluid flow existed.

It will be appreciated that in a liquid metal or conductive fluid system wherein a Faraday type pump creates the movement or a generator of the conductive fluid type is used, that there is but one moving part. That moving part is the conductive fluid or liquid metal itself. Since this system has but one moving part, it is obvious that a highly efficient and mechanically simple arrangement is yielded. This type system provides a simplicity which is needed in certain applications of power transformation where a strict limit must be placed on the types or number of moving parts. This is particularly true where the system is subjected to vibration, shock, or acceleration.

It is the primary object of the present application to disclose direct current to direct current, alternating current to direct current, or alternating current to alternating current type power transforming devices which utilize the same basic construction.

A further object of the present novel device is to disclose a power transformer that has a conductive fluid or liquid metal as its transforming medium.

Yet another object is to provide a unique power transforming device that is substantially immune to vibration or acceleration forces.

Still a further object of the present disclosure is to describe a highly simplified and inexpensive construction for a power transforming device.

Figure 2:
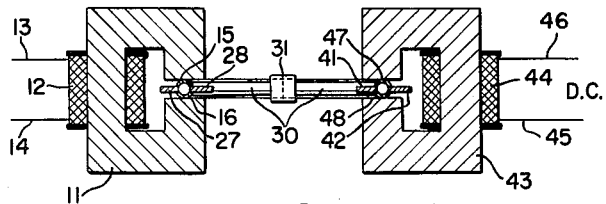
Figure 3:
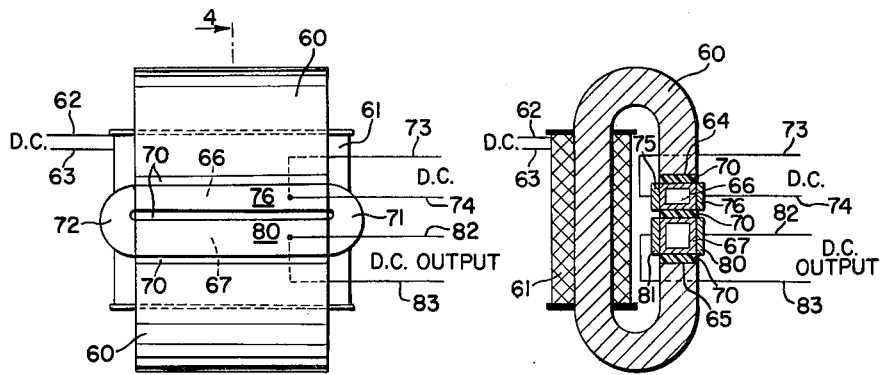
Figure 4:
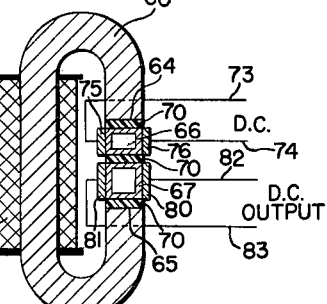

These and other objects will become apparent when the attached drawings are considered with the present specification, wherein:

FIGURES 1 and 2 are an elevation and cross section of an embodiment of the novel device, and FIGURES 3 and 4 are an elevation and cross section of a second embodiment of the device.

Referring first to the device disclosed in FIGURES 1 and 2, a conductive fluid pump is generally disclosed at 10. This pump consists of a C-shaped magnetic member 11 which is encircled by an energizing coil 12. The coil 12 can be of any convenient construction and merely must have a sufficient resistance or reactance to limit the current passing through it to an appropriate level. Leads 13 and 14 are connected to coil 12 to supply the appropriate energization. When an appropriate energizing source is connected between leads 13 and 14 the coil 12 sets up a magnetic field in core 11 which passes between the pole ends 15 and 16. This provides the magnetic field for a Faraday type of electromagnetic pump.

In order to supply the mutually perpendicular current for the flux between poles 15 and 16, a conventional transformer arrangement is supplied on a core 20. Core 20 is a rectangular closed magnetic circuit having two coils 21 and 22. The coils 21 and 22 are of any convenient design and the coil 21 will usually have a substantially greater number of turns as compared to coil 22 to provide a step down type of transformation of electrical energy. The coil 21 has leads 23 and 24 so that an input of electrical power can be supplied. The lead 14 of the coil 12 is conneceetd to lead 23 of the coil 21 to complete a series connection of this coil so that the coils 12 and 21 may be conveniently energized to form a source of power which has been represented as 115 volts, 60 cycles. It is apparent that the energization of coils 12 and 21 by an alternating current source will provide a magnetic flux between the poles 15 and 16 and also an energization of the primary winding or coil 21 so as to induce a current in coil 22. The current induced in coil 22 is of a low voltage and exceedingly high current. The current developed in coil 22 is supplied by conductors 25 and 26 to electrodes 27 and 28. The electrodes 27 and 28 are inserted into a fluid passage means or fluid flow circuit 30. The insertion of the electrodes 27 and 28 into the fluid passage 30 can best be seen in FIGURE 2. The electrodes 27 and 28 are at right angles to the poles 15 and 16 and therefore are at right angles to the magnetic field which is generated at these poles. Upon energizing the pump 10, the magnetic field and electric current are supplied perpendicular to one another and according to the teachings of Faraday this arrangement will create a mutually perpendicular force in a conductive fluid or liquid metal contained in the passage means 30. This force will then immediately cause the conductive fluid to be pumped around the channel 30 in a continuous manner.

The fluid passage 30 is made up of two U-shaped tubes of insulating material which are joined by collars 31 and 32. It will be understood that the tubes of passage 30 could be made of metal if the resistance of the metal is substantially greater than the resistance of the conductive fluid or liquid metal contained in the passage 30. When utilizing such conductive fluids as sodium-potassium, sodium or potassium, as well as mercury, it is possible to build the conductive fluid passage 30 of a high resistance steel and still obtain a satisfactory level of operation. The electrodes 27 and 28 can be conveniently built into the side of the passage 30 by welding or soldering and a completely fluid tight passage can be thus developed.

A fluid converter is shown generally at 40 and consists of a device quite similar to a portion of the pump disclosed at 10. The converter consists of two electrodes 41 and 42 which are inserted into the walls of the passage 30 so as to be in contact with the conductive fluid contained within the passage. Mutually perpendicular to the direction of fluid flow and to the two electrodes 41 and 42 there is placed a C-shaped magnetic structure 43. The magnetic structure 43 has an energizing coil 44 which is conveniently connected to any source of direct current by means of conductors 45 and 46. It will be appreciated that upon energization of the coil 44 by a direct current, a magnetic flux appears between the pole pieces 47 and 48. The magnetic flux is perpendicular to the electrodes 41 and 42 and the electrodes and flux are mutually perpendicular to the line of flow of the conductive fluid.

If the pump 10 is operating so as to circulate a conductive fluid around the closed passage means 30, and a magnetic flux is generated between pole pieces 47 and 48, the requisite conditions of generation of an electric current have been met. It will be appreciated that an electric current will therefore be available between electrodes 41 and 42 and that conductors 50 and 51 can be utilized to provide a direct current output from the device as described. The magnitude of the direct current output will be a function of the velocity of the conductive fluid passing through the passage means 30 and of the magnetic field between poles 47 and 48. It becomes apparent that a power transformation device has been described wherein a level of alternating current has been put into the device and a different level of direct current is capable of being taken out of the device.

In considering the device disclosed in FIGURES 1 and 2 it is pointed out that the pump 10, while shown as an alternating current device, can be conveniently replaced by a direct current operated device. This can be accomplished readily by energizing the coil 12 with a direct current or by making the core structure 11 of a permanent magnetic material. In addition to these changes the power supplied to electrodes 27 and 28 would be of a direct current type. If a direct current and a constant magnetic field react, the same type of pumping pressure would be supplied in the passage means 30 as is pointed out by the alternating current device specifically disclosed in FIGURES 1 and 2.

It will be appreciated that the device disclosed in FIGURES 1 and 2 does not limit transformation of any level of alternating current to a direct current, or any level of direct current to any other level of direct current. A further modification of FIGURES 1 and 2 can be easily accomplished to convert alternating current to alternating current. This modification is merely a substitute of alternating current to the coil 44 and the resultant generation of an alternating current between electrodes 41 and 42. It is apparent that one of the primary objects of the present invention can be readily attained by the selective energization of the unit described. It will be appreciated that this device provides a transforming function not normally available in more conventional type devices. It is a further object of the present device that the sole moving part is a conductive fluid which fills the passage means 30. This arrangement is obviously not subject to disruption or interferences by vibration, acceleration or similar types of disturbances.

A modification of the device disclosed in FIGURES 1 and 2 is shown in FIGURES 3 and 4. The device disclosed in FIGURES 3 and 4 utilizes the same basic principle but differs in that the unit utilizes a single magnetic field and a single magnetic core. This core is presented as 60 and is disclosed as a C-shaped core member. Around the core 60 is formed a coil 61 which is energized, in the disclosed embodiment, by a direct current source on conductors 62 and 63. It is obvious that the energization of coil 61 by a direct current source will provide a magnetic field of a constant nature between poles 64 and 65. It is further apparent that the coil and direct current energizing source could be replaced by a permanent magnetic core alone.

Placed between the pole faces 64 and 65 are two conductive fluid passages 66 and 67. These passages are insulated from one another and from the poles 64 and 65 by means of an insulating material 70. The passages 66 and 67 are joined at their opposite ends by two U-shaped passage members 71 and 72. By joining the passages 66 and 67 together a conductive fluid passage is provided and this passage is filled with a conductive fluid or liquid metal. It will be noted that the passages 66 and 67 are of different cross sectional areas and any movement of fluid in the passages will necessitate different velocity since the passages are closed upon each other by the U-shaped members 71 and 72. If a direct current source is supplied to conductors 73 and 74 and to electrodes 75 and 76 of the flow channel, it is apparent that a current will flow across the conductive fluid channel 66 in a perpendicular relationship to the magnetic field between poles 64 and 65. The construction is that of a Faraday pump and the conductive fluid in channel 66 is pumped out of that channel. This pumping action in turn circulates the conductive fluid in the U-shaped end members 71 and 72 and causes the fluid to flow in the lower channel 67. It is obvious that since the channels 66 and 67 are connected by the U-shaped members 71 and 72, that the flow in the two channels 66 and 67 must be of different velocity since the cross sectional areas of these two channels are different. The conductive fluid flowing in the channel 67 crosses a constant magnetic field between the poles 64 and 65 and establishes a conductive fluid generating means. It is therefore apparent that electrodes 80 and 81 will have a direct current available to them which can be in turn taken out of the device by conductors 82 and 83. A direct current to direct current transforming device has thus been described. In order to select the ratio of transformation it is merely necessary to select the relative cross sections of channels 66 and 67 to provide the desired ratio. Further, any difference in the lengths of the channels 66 and 67 will vary the ratio of transformation.

The device disclosed in FIGURES 3 and 4 can be modified readily to make it an alternating current transformer and the transformation ratio is again related to the areas or the cross sections of channels 66 and 67.

The present application has described in detail two embodiments of a magnetic power transforming means utilizing a conductive fluid as the transforming medium. A number of possible variations have been specifically described in order to more fully disclose the principle and possible applications of the device. The specific embodiments described are for illustrative purposes only and are not by any means to be considered as limitations as to the scope of the present invention. The scope of the invention is limited only by the appended claims.

I claim as my invention:

1. An electrical transforming device of the class described: closed passage means filled with a liquid metal; magnetic flux generating means adjacent said passage means and generating a magnetic flux across said passage means; current generating means including a pair of electrodes; said current generating means passing a current between said electrodes across a portion of said passage means mutually perpendicular to said magnetic flux and said liquid metal; said magnetic flux and said current causing said liquid metal to flow around said closed passage means; and a second pair of electrodes across said passage in alignment with said first pair of electrodes; said second pair of electrodes mutually perpendicular to said magnetic flux and said liquid metal flow; said second pair of electrodes collecting a current generated by the flow of said liquid metal through said magnetic field.

2. An electrical transforming device of the class described: closed passage means filled with a conductive fluid; magnetic flux generating means adjacent said passage means and generating a magnetic flux across said passage means; current generating means including electrode means; said current generating means passing a current between said electrode means across a portion of said passage means mutually perpendicular to said magnetic flux and said fluid; said magnetic flux and said current causing said fluid to flow around said closed passage means; and second electrode means across said passage means mutually perpendicular to said magnetic flux and said fluid flow; said second electrode means collecting a current generated by the flow of said fluid through said magnetic field.

References Cited in the file of this patent

UNITED STATES PATENTS

| | | |
|---|---|---|
| 2,490,009 | Thomas | Nov. 29, 1949 |
| 2,669,873 | Gardner et al. | Feb. 23, 1954 |
| 2,715,190 | Brill | Aug. 9, 1955 |
| 2,838,001 | Robinson | June 10, 1958 |
| 2,978,985 | Lindenblad | Apr. 11, 1961 |